United States Patent Office 3,095,305
Patented June 25, 1963

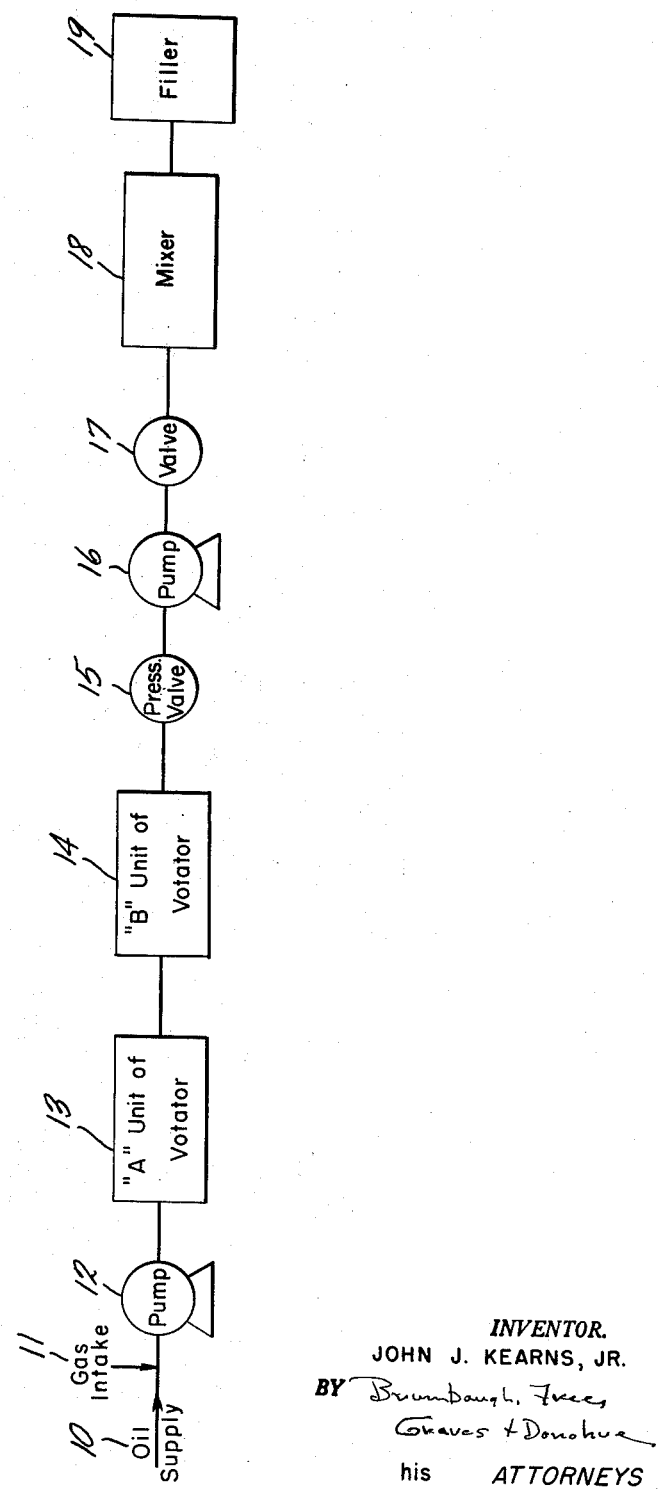
INVENTOR.
JOHN J. KEARNS, JR.
BY Brumbaugh, Free,
Graves & Donohue
his ATTORNEYS

3,095,305
PROCESS FOR PRODUCING AERATED
SHORTENING
John J. Kearns, Jr., Hasbrouck Heights, N.J., assignor to Lever Brothers Company, New York, N.Y., a corporation of Maine
Filed Jan. 19, 1961, Ser. No. 83,684
6 Claims. (Cl. 99—118)

This invention relates to an improved process for preparing an aerated shortening. In particular, the invention relates to a process for preparing an aerated shortening containing a large volume of occluded gas, i.e., a shortening containing from 15 to 32% of an aerating gas.

Plastic cooking fats have been aerated with an innocuous gas, such as air or nitrogen, for a considerable number of years. The purpose of the aerating procedure is to improve the appearance of the shortening. Non-aerated plastic shortenings are yellowish, translucent materials, and have a very unappetizing appearance. However, by incorporating an aerating gas into the shortening in the form of uniformly dispersed very small bubbles, a white opaque appearance which is more pleasing to the eye of a consumer is obtained. Amounts of occluded gas up to 20% by volume have been used in preparing commercial aerated shortenings.

Aeration of shortenings has been conducted by a number of well-known methods. The use of a chilling roll followed by a "picker" box was the first popular method. The picker box whipped a certain proportion of air into the chilled shortening. In order to improve the smoothness of the shortening and uniformity of the size of the gas bubbles, the material leaving the picker box has been subjected to a subsequent homogenization step.

More recent methods employ a Votator system in place of the chilling roll and picker box. This system provides a number of advantages, including a faster production rate and compact equipment. Such a method is described in the Dalziel Patent No. 2,882,165.

A Votator consists of one or more thin walled nickel tubes surrounded by a cooling medium such as evaporating liquid ammonia. The tubes, commonly known as the "A" unit of the Votator, are provided with internal rotating blades which remove the thin film of chilled material from their walls. After chilling, the mixture, which is nucleated with minute fat crystals, passes to a chamber or "B" unit of the Votator where crystallization of the fat is permitted to continue with mild agitation. The Votator is described on pages 702–708 of "Industrial Oil and Fat Products," Interscience Publishers Inc., New York, 1945, by A. E. Bailey.

Some conventional methods conduct both the chilling and crystallization steps under pressure and then subject the aerated shortening to a homogenizing step by passing it through a constriction such as a gate valve. The Dalziel process follows the chilling stage or "A" unit by the homogenizing step and permits crystallizing to take place thereafter in a "B" unit.

When preparing aerated shortenings containing a high level of occluded gas, i.e., in the range of 15 to 32% by volume, considerable difficulty is encountered in obtaining a uniform product. The high level of aerating gas gives a coarse dispersion of the occluded gas and a poorly textured product.

The term "aerated shortening" as used in this specification means a product which comprises substantially 100% by weight of an edible fat or mixtures of fats which are substantially solid or plastic at room temperature and which have incorporated therein a certain percentage by volume of an innocuous aerating gas.

It has been found that aerated shortening containing a high level of occluded gas, i.e., from 15 to 32% by volume, can be prepared having a smooth uniform texture and a desired uniform opaque whiteness without the presence of undesirable dark streaks by mixing or working the chilled aerated shortening stock at approximately atmospheric pressure after extrusion thereof through a texturating valve in a conventional process. In its entirety, the process of this invention comprises the steps of aerating a liquid fat with an innocuous gas, chilling the stream of liquid fat under a substantial pressure, permitting the chilled aerated fat to partially crystallize under pressure with agitation in a first crystallization stage, passing the partially crystallized aerated shortening through a texturating valve to homogenize the stream of fat, accompanied by a sudden release of pressure to substantially atmospheric pressure and subjecting the homogenized stream of aerated fat to a second partial crystallization step with agitation to accomplish working or mixing thereof at approximately atmospheric pressure. Following the second crystallizing step, the shortening is packaged in containers.

The sequence of steps in the process of this invention through the passage of the stock through the texturating valve represents a process which is known and used in the art. The novel feature of the method of this invention is the utilization of a second partial crystallization step following the texturating valve whereby the homogenized stream of fat is subjected to moderate working or agitation at approximately atmospheric pressure.

The fats which may be used in preparing aerated shortenings according to this invention may be any of the usual shortening stocks employed in preparing plastic shortenings. Various fats such as cottonseed oil, soybean oil, lard, palm oil and other vegetable and animal fats, or mixtures thereof, either unhydrogenated or in various stages of hydrogenation, may be used, so long as the material is solid or plastic at room temperature.

The gas employed in the aerating of the shortenings of this invention may be any of the usual innocuous gases. Air or nitrogen are commonly employed and nitrogen is preferred.

The pressures under which the chilling and first crystallization step take place are also generally well known in the art. A preferred range of pressures is from 200 to 400 pounds per square inch gauge. The pressures in the system following the texturating valve are approximately atmospheric, although some positive pressure must be maintained to insure movement of the fat stream through the system. Generally speaking, pressures in the range of 25 pounds per square inch gauge are used at this point in the process. In the chilling step, it is preferred that a pressure is used which is sufficient to insure that all of the introduced gas is in solution during chilling. Similarly, it is preferred that the pressure on the downstream side of the texturating valve be such that substantially all of the introduced gas is in an entrained or occluded state rather than in solution.

The invention is illustrated in the accompanying diagrammatic drawing which shows a complete system for continuously processing an aerated shortening according to this invention.

Referring to the drawing, a liquid shortening is introduced into the system at 10 from a suitable storage tank, not shown. Air, nitrogen or other innocuous aerating gas is introduced through a suitable valve at gas intake 11. A positive displacement pump 12 draws the oil from the oil supply 10 and carries it to a fat-chilling unit 13, under presure. The chilling unit shown in the drawing is an "A" unit of a Votator, described above. The volume of gas introduced through the gas intake may be regulated by a suitable flow indicator, not shown.

From chilling unit 13 the chilled aerated shortening passes under pressure to a crystallizing unit, 14. The crystallizing unit may be a conventional "B" unit of a Votator, as described above. In this step of the process, a partial crystallization of the shortening under pressure is achieved. From the crystallizing unit 14, the shortening passes through a back pressure valve 15. The valve 15 insures maintenance of the desired pressure in the system from pump 12 through the chilling unit 13 and the crystallizing unit 14.

A second positive displacement pump 16 is employed to insure the desired pressure on the stream as the shortening passes through the texturating valve 17. The texturating valve 17 may be any one of the conventional types of valves employed for this purpose, such as a gate valve or a needle valve. The constriction in the line formed by valve 17, because of the pressure differential on each side thereof, creates intense shearing forces which break up aggregates of the material and insure the formation of a homogeneous mixture on the downstream side.

From the texturating valve 17, the shortening passes to a mixer 18 wherein the shortening is mixed or worked at approximately atmospheric pressure. The mixer 18 may be of a design similar to the conventional B unit of a Votator. In the process of this invention, mixer 18 is the apparatus wherein the second crystallization step takes place. From the mixer 18, the aerated shortening is discharged to a packaging machine or filler 19 wherein the aerated shortening is placed in suitable containers.

A return line, not shown, is located in the conduit between the mixer 18 and the filler 19 in a conventional manner. The return line leads to the oil supply 10 and is used during interruptions in operation of the filler 19. A heat exchanger, not shown, is preferably employed in the return line to remelt the aerated shortening.

A somewhat less preferred, but operable, embodiment of the invention employs a picker box or "B" unit of a Votator between the back pressure valve 15 and the pump 16. A satisfactory product is obtained using this embodiment of the invention, but the stock entering the filler 19 is appreciably softer and causes more difficulty in the filling of containers in plant operation.

The process of this invention may be described with reference to the drawing as follows:

A suitable blend of cottonseed and soybean oils, containing approximately 90% partially hydrogenated soybean oil, about 6% of fully hydrogenated cottonseed oil and about 4% of a mono-diglyceride emulsifier, is fed from the oil supply 10 through the positive displacement pump 12 to the chilling unit 13. Gaseous nitrogen is introduced at the gas intake 11 in an amount sufficient to provide about 21% of nitrogen in the final packaged product. The liquid fat is introduced into the chilling unit 13 at a pressure of 300 pounds per square inch gauge. As the stock leaves the chilling unit 13, it has a temperature between 13 and 16° C.

After leaving the chilling unit 13, the shortening is carried to the crystallizing unit 14 wherein the shortening is subjected to a partial crystallization with agitation. From the crystallizing unit 14, the shortening passes through a back pressure valve 15 and the pump 16 to the texturating valve 17.

A pressure of 300 pounds per square inch gauge is maintained in the line after the pump 12, and this pressure is reduced by frictional losses to about 200 to 250 pounds per square inch gauge at the back pressure valve 15. The temperature of the stream at the discharge end of the crystallizing unit 14 is 17° C. The pressure in the system between the pump 16 and the texturating valve 17 is maintained at 300 pounds per square inch gauge.

After passing through the texturating valve 17 the shortening is carried to the mixer 18 under a pressure of 25 pounds per square inch gauge. The stream of shortening is then subjected to agitation in the mixer 18, the mixer being operated at from about 500 to 1200 r.p.m. The temperature of the fat stream at the outlet side of the mixer is 21° C. From the mixer, the stream of fat is carried to the filler 19 and placed directly into consumer packages of cans.

It is to be noted that the operation of the mixer 18 constitutes an important feature of this invention. The applicant has found that a substantial degree of working of the aerated chilled shortening must take place at approximately atmospheric pressure in order to obtain a uniform dispersion of the occluded gas throughout the shortening product. A uniform dispersion is, of course, necessary to the realization of a fine textured homogenous product of good appearance.

A preferred apparatus for use as a mixer 18 is a conventional B unit of a Votator. One suitable commercial unit is approximately four feet long and free nine to ten inches in diameter. This unit has a longitudinal shaft with pins thereon. Staggered pins are also provided in the walls of the unit and rotation of the shaft during passage of the shortening provides a rake effect. This unit is operated at from 500 to 1200 r.p.m. in order to provide the desired good quality product.

An additional advantage of the process of this invention is that it is unnecessary to either heat or cool the stream of fat leaving the texturating valve 17. According to some prior art processes, equipment following the texturating valve is jacketed to permit warming of the surface of the fat stream. This is unnecessary in the process of this invention.

I claim:

1. A process for producing an aerated shortening which comprises placing a stream of chilled aerated liquid fat under a high pressure, partially crystallizing the stream of chilled aerated fat under said pressure with agitation, suddenly releasing substantially all of said pressure, and subjecting the fat to a second partial crystallization with agitation at approximately atmospheric pressure, the stream of chilled aerated liquid fat containing sufficient aerated gas to insure that the aerated shortening obtained contains from 15 to 32% of an aerated gas.

2. A continuous process for producing an aerated shortening which comprises placing a stream of chilled aerated liquid fat under a pressure of from about 200 to 400 p.s.i.g., partially crystallizing the stream of chilled aerated fat under the said pressure with agitation, suddenly releasing substantially all of said pressure, and subjecting the fat to a second partial crystallization with agitation at approximately atmospheric pressure, the stream of chilled aerated liquid fat containing sufficient aerated gas to insure that the aerated shortening obtained contains from 15 to 32% of an aerated gas.

3. A method for producing an aerated shortening which comprises the steps of aerating a liquid fat with an innocuous gas, chilling the liquid fat under a high pressure, permitting the chilled aerated fat to partially crystallize under the high pressure, homogenizing the fat and suddenly releasing the pressure thereon to approximately atmospheric pressure through a constrictive orifice, and subjecting the homogenized stream of aerated fat to a further subsequent partial crystallization step with a moderate degree of agitation at approximately atmospheric pressure, the stream of chilled aerated liquid fat containing sufficient aerated gas to insure that the aerated shortening obtained contains from 15 to 32% of an aerated gas.

4. A method for producing and packing an aerated shortening which comprises the steps of aerating a liquid fat with an innocuous gas, chilling the liquid fat under a pressure of about 200 to 400 p.s.i.g., permitting the chilled aerated fat to partially crystallize with agitation under a pressure of about 200 to 400 p.s.i.g., suddenly releasing the pressure to a pressure within the range of from about atmospheric pressure to about 25 p.s.i.g. through a texturating valve, subjecting the shortening to a second partial crystallizing step with agitation at a pressure of no more than about 25 p.s.i.g. and packing the shortening, the stream of chilled aerated liquid fat containing sufficient aerated gas to insure that the aerated shortening obtained contains from 15 to 32% of an aerated gas.

5. A method for producing an aerated shortening which comprises the steps of aerating and chilling a stream of liquid fat, passing the fat stream through a first partial crystallization step with agitation, homogenizing the fat, and passing the fat stream through a second partial crystallization step with agitation, the chilling and first partial crystallization steps being carried out at a pressure of from about 200 to 400 p.s.i.g., the second partial crystallization step being carried out at a pressure within the range of from about atmospheric pressure to about 25 p.s.i.g., and the homogenizing step including a sudden reduction in pressure on the shortening from the high to the low pressure conditions through a constrictive orifice, the stream of chilled aerated liquid fat containing sufficient aerated gas to insure that the aerated shortening obtained contains from 15 to 32% of an aerated gas.

6. The method of claim 5 including the additional step of packaging the shortening immediately following the second crystallization step.

References Cited in the file of this patent
UNITED STATES PATENTS

| | | |
|---|---|---|
| 2,882,165 | Dalziel et al. | Apr. 14, 1959 |
| 2,973,269 | Melnick | Feb. 28, 1961 |